Feb. 12, 1946.  R. JONGEDYK  2,394,700
ARTICLE FORMING APPARATUS
Filed Nov. 12, 1942  5 Sheets-Sheet 1

INVENTOR
R. JONGEDYK
BY
ATTORNEY

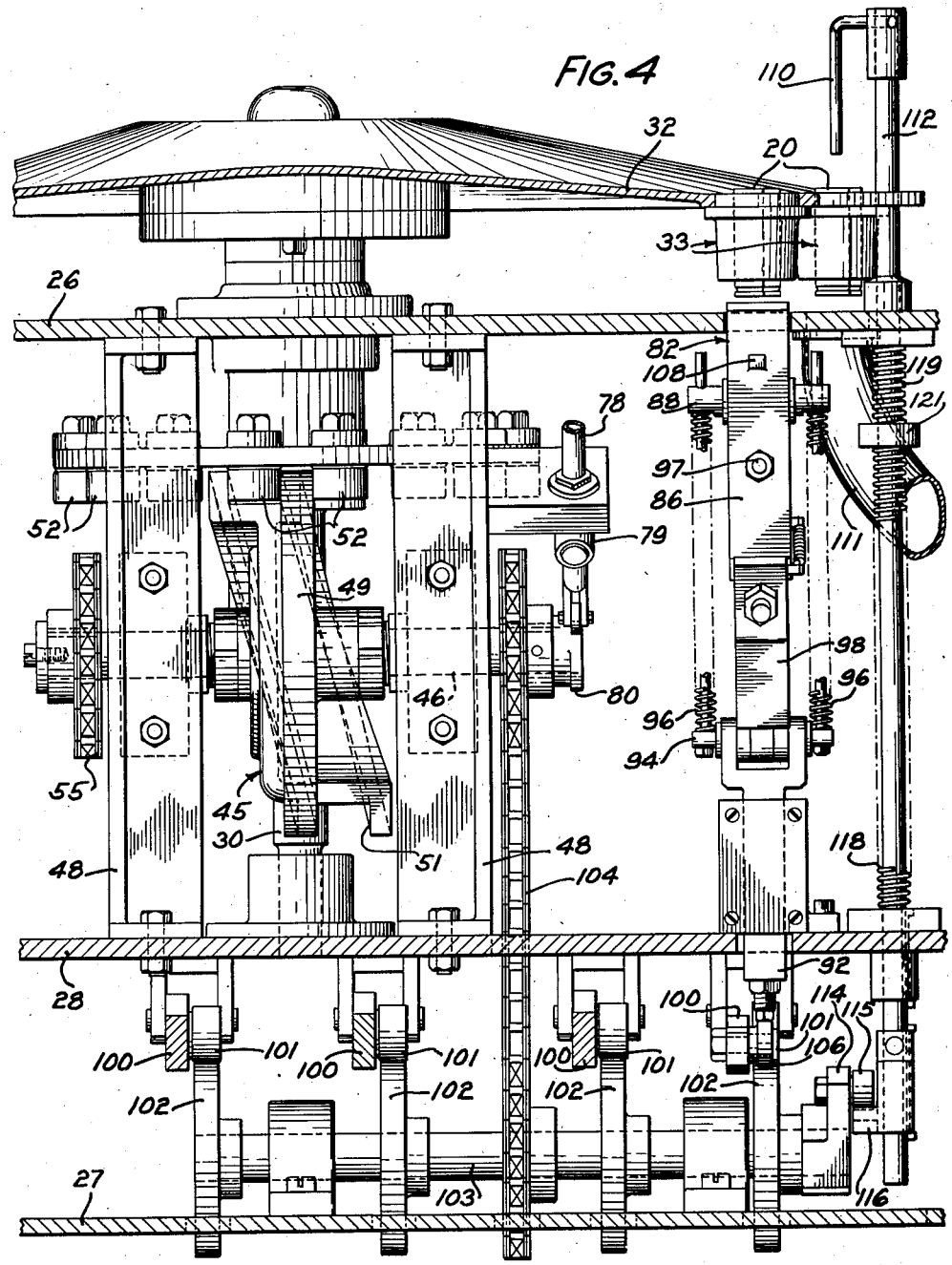

Feb. 12, 1946.   R. JONGEDYK   2,394,700
ARTICLE FORMING APPARATUS
Filed Nov. 12, 1942   5 Sheets-Sheet 3
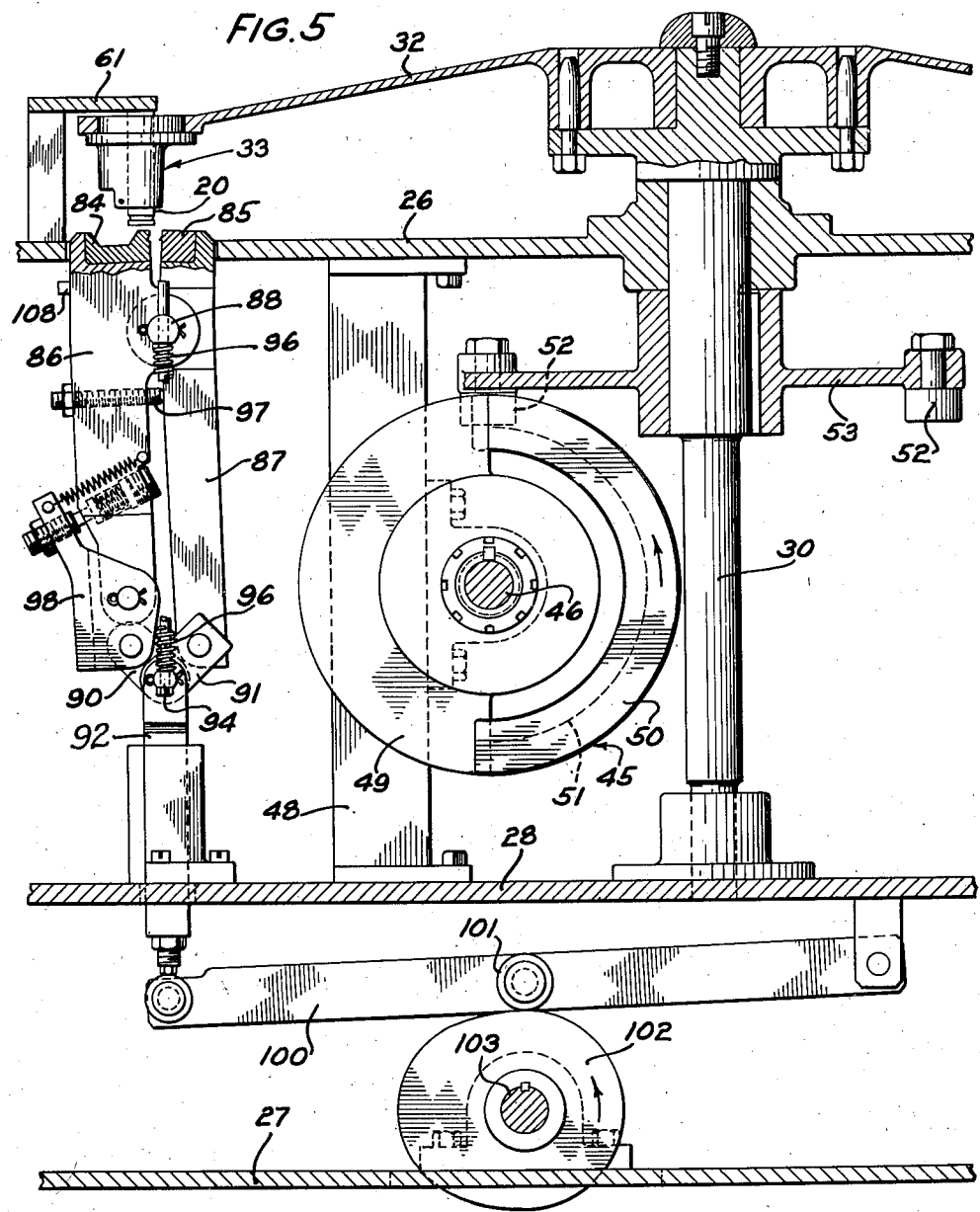
INVENTOR
R. JONGEDYK
BY Harry L. Duff
ATTORNEY Feb. 12, 1946. R. JONGEDYK 2,394,700
ARTICLE FORMING APPARATUS
Filed Nov. 12, 1942 5 Sheets-Sheet 4
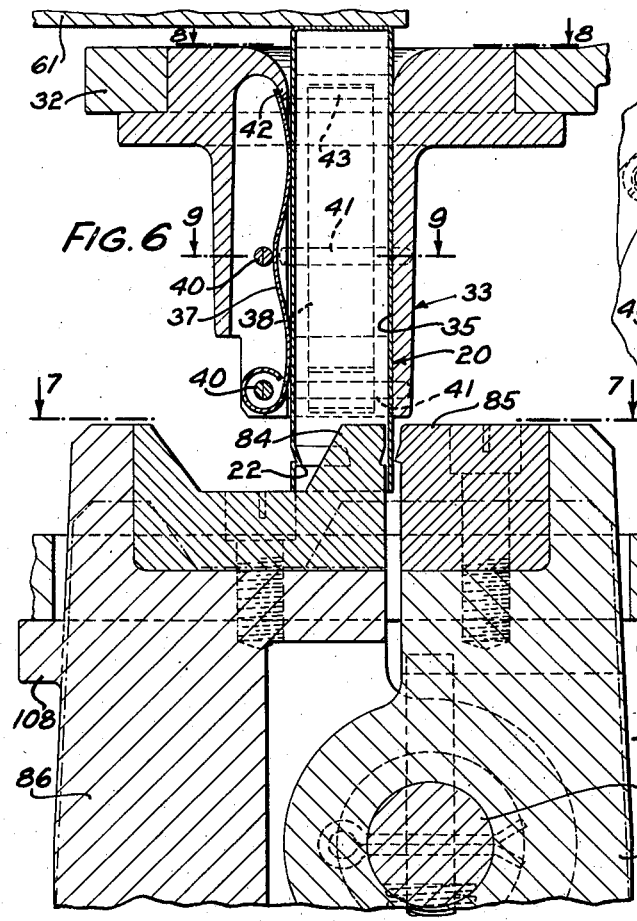
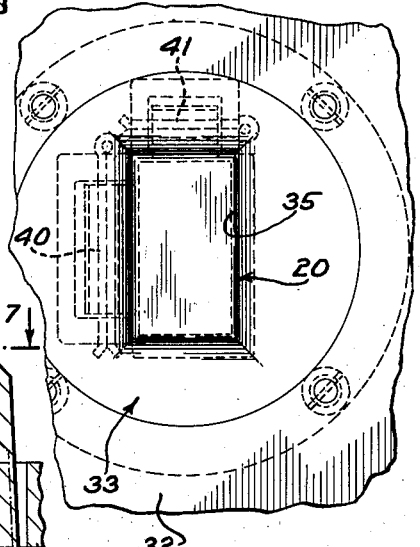
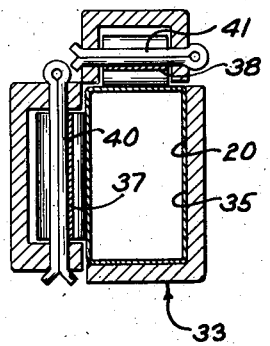
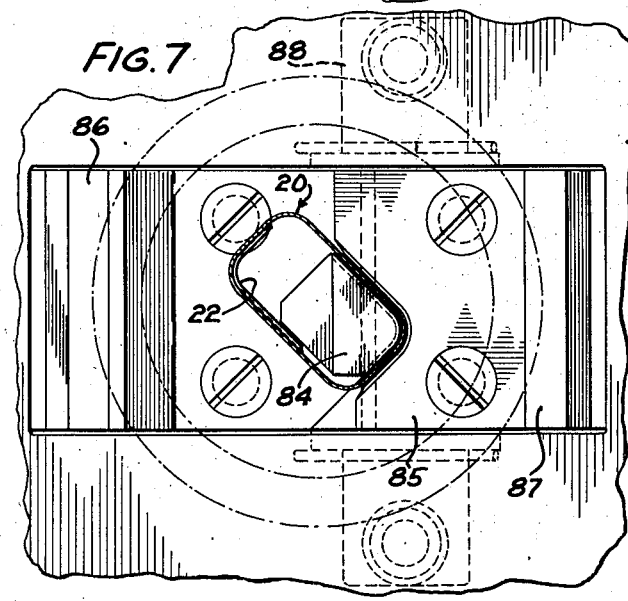
INVENTOR
R. JONGEDYK
BY
ATTORNEY Feb. 12, 1946.   R. JONGEDYK   2,394,700
ARTICLE FORMING APPARATUS
Filed Nov. 12, 1942   5 Sheets-Sheet 5
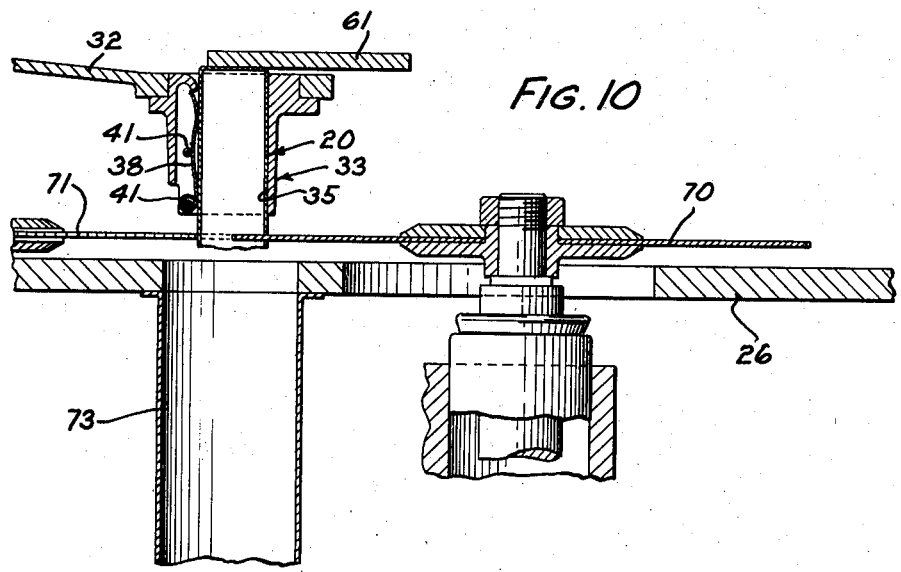
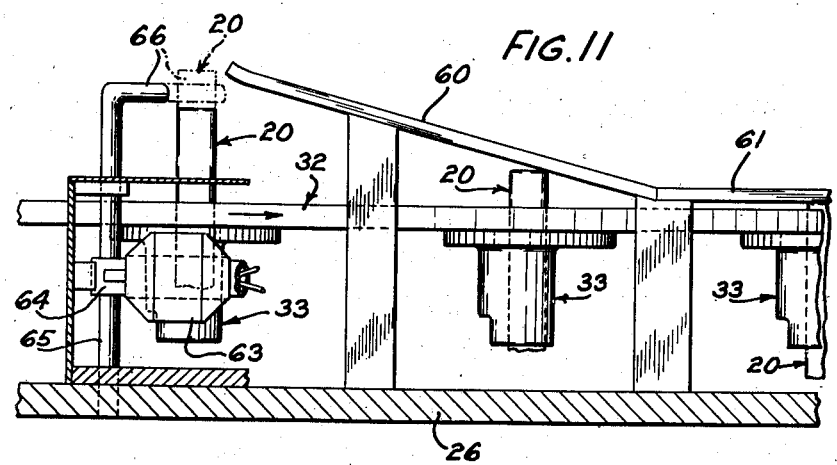
INVENTOR
R. JONGEDYK
BY *Harry J. Duft*
ATTORNEY Patented Feb. 12, 1946

2,394,700

UNITED STATES PATENT OFFICE 2,394,700

ARTICLE FORMING APPARATUS

Ralph Jongedyk, Hinsdale, Ill., assignor to Western Electric Company, Incorporated, New York, N. Y., a corporation of New York Application November 12, 1942, Serial No. 465,359

5 Claims. (Cl. 153—16)

This invention relates to article forming apparatus, and more particularly to apparatus for trimming and embossing metal containers, such as condenser cans.

Objects of the invention are to provide apparatus for forming metal containers and the like, expeditiously, economically and with a minimum amount of manual effort.

One embodiment of the invention contemplates the provision of an apparatus for trimming and embossing metal containers, in which the containers are placed in fixtures on a rotary table which indexes the containers to successive stations where the trimming and embossing operations are performed, after which the completed containers are automatically ejected from the fixtures. The embossing operations are performed by cooperating embossing dies mounted on pivoted supports which are operated by cam actuated toggle mechanisms.

Other features and advantages of the invention will become apparent from the following detailed description when read in conjunction with the accompanying drawings, in which Fig. 1 is a plan view of a condenser can trimming and embossing apparatus embodying the features of the invention;

Fig. 4 is an enlarged fragmentary vertical sectional view taken on line 4—4 of Fig. 1;

Fig. 5 is an enlarged fragmentary vertical sectional view taken on line 5—5 of Fig. 1;

Fig. 6 is an enlarged fragmentary sectional view taken on line 6—6 of Fig. 1, with the embossing dies shown in their elevated positions prior to an embossing operation;

Fig. 7 is a fragmentary plan sectional view taken on line 7—7 of Fig. 6;

Fig. 8 is a fragmentary plan sectional view taken on line 8—8 of Fig. 6;

Fig. 9 is a fragmentary plan sectional view taken on line 9—9 of Fig. 6;

Fig. 10 is an enlarged, fragmentary vertical sectional view taken on line 10—10 of Fig. 1, and Fig. 11 is an enlarged, fragmentary vertical sectional view taken on line 11—11 of Fig. 1.

Figure 2:
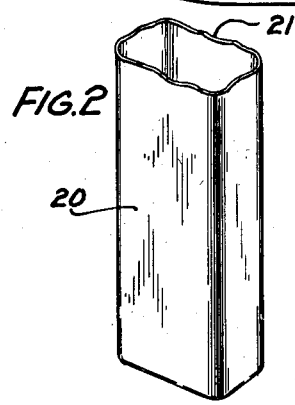
Fig. 2 is a perspective view of an extruded condenser can of the type that is adapted to be trimmed and embossed by the apparatus shown in Fig. 1.
Figure 3:
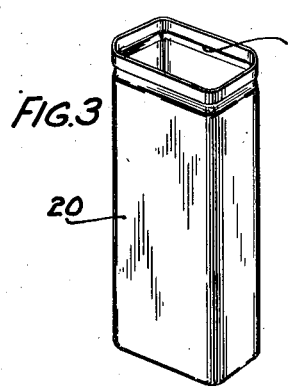
Fig. 3 is a perspective view of the same condenser can after it has been trimmed and embossed by the apparatus shown in Fig. 1.

The apparatus illustrated in the drawings may be used to advantage in completing the manufacture of extruded condenser cans 20 of the type illustrated in Fig. 3. The open ends of these cans, when discharged from the extrusion machine, have an irregular edge 21, as shown in Fig. 2, and one of the functions of this apparatus is to trim or cut off the irregular edge so that the finished can will have a smooth open end, as shown in Fig. 3. Another and more important function of the apparatus is to form an internal bead or ledge 22 near the open end of the can for supporting the cover or terminal plate of the condenser which is subsequently mounted within the can.

Figure 1:
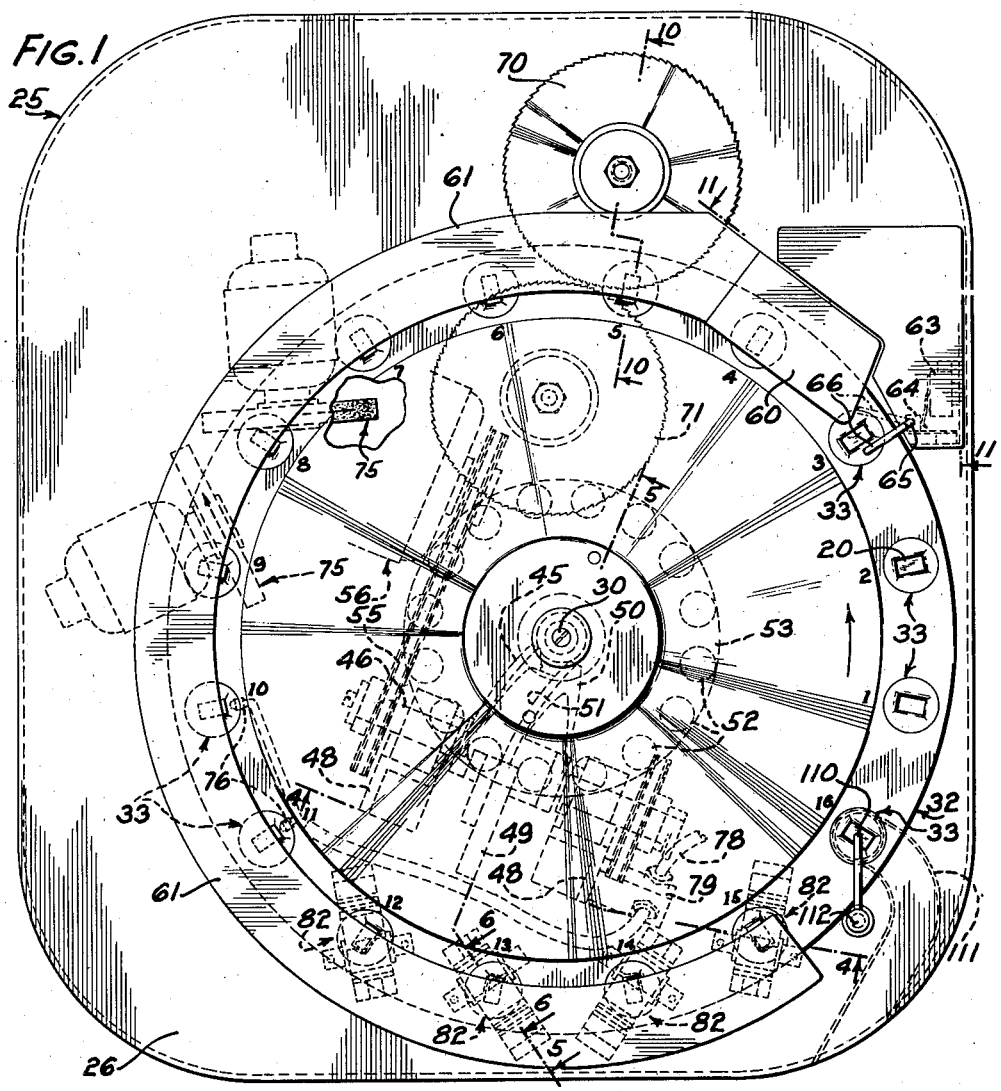

Referring now to Figs. 1, 4 and 5 of the drawings, the apparatus illustrated therein comprises a casing 25 having top and bottom plates 26 and 27, respectively, and an intermediate horizontal plate 28 (Fig. 4), which divides the casing into upper and lower compartments. A vertical shaft or spindle 30 (Fig. 5) is rotatably journaled in the upper compartment of the casing, and the upper end of this shaft extends above the top plate 26 and has a circular turn table 32 secured thereto. This table carries a circular series of equidistantly spaced work holding fixtures 33, 33, each of which is adapted to receive and hold a condenser can 20 of the particular size and shape that is to be handled by the apparatus. Preferably, the fixtures 33 are removably mounted in the turn table so that they are readily interchangeable with other fixtures for accommodating metal cans of different sizes and shapes.

Each of the fixtures 33 comprises a flanged casing having a vertical bore 35 (Figs. 6, 8 and 9) of substantially rectangular cross section for receiving the condenser can 20 which is placed in the fixture in an inverted position, as best shown in Fig. 6. Flat bowed springs 37 and 38 are provided in suitable recesses in two adjoining walls of the bore 35 for yieldably pressing the condenser can against the opposite walls of the bore, whereby the cam is prevented from dropping through the fixture. These clamping springs 37 and 38 are held in position by cotter pins 40 and 41, respectively, and by overhanging lips 42 and 43 on the upper end of the fixture.

Mechanism is provided for indexing the turn table 32 to advance the work holding fixtures, step by step, through a series of stations arranged around the table. In the illustrated embodiment of the invention, there are sixteen stations equidistantly spaced around the table, and the latter is rotated through one-sixteenth ($\frac{1}{16}$) of a revolution during each indexing period. The indexing mechanism comprises an indexing cam 45 (Figs. 1, 4 and 5) which is fixed to a horizontal shaft 46 journaled in suitable bearings attached to vertical standards 48—48 interposed between the upper plate 26 and intermediate plate 28. The indexing cam comprises two semi-circular portions 49 and 50. The portion 50 is formed with a peripheral cam groove 51 for driving engagement with a circular series of rollers 52, 52 mounted in a circular plate 53 secured to the spindle 30. The portion 49 of the cam is flat and of uniform cross section and is a tight sliding fit for the space between any two adjacent rollers 52 on plate 53. Thus, the grooved portion 50 of the cam cooperates with the rollers 52 to index the turn table during the first one-half of each revolution of shaft 46, while the flat portion 49 of the cam cooperates with the same rollers to prevent angular displacement of the turn table during the last one-half of each revolution of the shaft. The cam groove 51 is designed so that, for each revolution of the shaft, the turn table is indexed through one-sixteenth ($\frac{1}{16}$) of a revolution, thus moving each fixture 33 to the next station. The shaft 46 is driven through a chain and sprockets 55 by a conventional motor driven speed reducing unit 56, only a portion of which is shown in broken lines in Fig. 1.

As mentioned above, sixteen (16) equidistantly spaced stations are provided around the turn table, and in Fig. 1 these stations are numbered from 1 to 16, inclusive. At either of the first two stations, an operator seated in front of the machine partially inserts a condenser can in an inverted position in each of the fixtures 33 while they dwell at said stations. Between station No. 3 and station No. 4 there is provided a fixed, inclined plate 60 (Figs. 1 and 11) by means of which the insertion of the condenser cans into the fixtures is completed while they are indexed from station No. 3 to station No. 4. The inclined plate forces the condenser cans into the fixtures to the required level, and, while succeeding operations are performed on the condenser cans, they are retained at the same level by means of an arcuate gauge plate 61 which extends from the inclined plate through stations 5 to 15, inclusive. It will be understood that the gauge plate will positively prevent upward movement of the condenser cans in the fixtures while positioned at any point between station No. 5 and station No. 15.

It is necessary, of course, that the condenser cans be manually inserted into the fixtures to a level sufficiently low to enable the cans to pass freely under the entrance end of the inclined plate 60. Therefore, it is preferable, in order to prevent jamming, that some means be provided for stopping the table indexing means whenever a condenser can is not manually inserted into a fixture to the proper level. Such means may comprise, for example, a normally closed micro switch 63 (Figs. 1 and 11) connected in the operating circuit of the driving unit 56 for the table indexing means. This switch may be arranged to be opened by a cam 64 on a vertical shaft 65 when the latter is turned in a clockwise direction (Fig. 1). This shaft may be formed with a horizontal portion 66 at its upper end for engagement by improperly inserted cans as they approach station No. 3, and it will be obvious that an improperly inserted can will move the horizontal portion of the shaft toward the position indicated in broken lines in Fig. 1, whereby the cam 64 will become effective for opening the switch 63 and thereby stop the driving motor of the table indexing means. When this occurs, it will be necessary to remove or properly insert the improperly positioned can before the switch 63 can be restored to its closed position so that the table indexing motor can be restarted.

While passing from station No. 4 through station No. 5 to station No. 6, the irregular edge 21 at the open end of each condenser can is cut off by means of two motor driven circular saws 70 and 71 (Figs. 1 and 10) which are arranged to operate in a common horizontal plane with each saw positioned so as to cut off approximately one-half of the irregular edge of each can. The sawed off portions of the cans drop through a conduit 73 (Fig. 10) into a suitable collecting receptacle (not shown).

Between station No. 7 and station No. 9, two motor driven wire brushes 75—75 (Fig. 1) are provided for removing the burrs from the sawed off ends of the condenser cans as they are indexed from station No. 7 to station No. 9, and at the next two stations air blast nozzles 76—76 are provided for blowing away the loose burrs and saw filings from the condenser cans. The air blast nozzles are connected to a compressed air line 78 through a control valve 79 (Fig. 4) operated by a cam 80 on shaft 46. The cam is designed to open the valve momentarily after each indexing movement of the turn table.

At station No. 12 and at each of the next three stations, an embossing tool 82 is provided for forming the internal bead or ledge 22 near the open end of each condenser can. This ledge is formed in four separate sections, each extending from a point midway of a side wall of the can around a corner to a point midway of an adjoining wall of the can. There is one embossing tool at each of the four stations referred to and each embossing tool is adapted to form one section of the ledge.

Since the four embossing tools are identical in construction and operation, the following description of one of them applies equally well to the other three. Each of the embossing tools comprises two cooperating embossing dies 84 and 85 (Figs. 5, 6 and 7) which are secured to the upper ends of pivoted supporting bars 86 and 87, respectively. These die supporting bars are pivoted near their upper ends on a common horizontal shaft 88. At their lower ends, the die supporting bars are pivotally connected by toggle links 90 and 91 (Fig. 5) to a vertically reciprocable plunger 92 which is connected to the toggle links by a horizontal pivot shaft 94. Interposed between the ends of this shaft and pivot shaft 88 are a pair of coil springs 96—96 which serve to hold the embossing dies in their open or separated positions. An adjustable stop screw 97 in die supporting bar 86 engages bar 87 to limit the opening movement of the dies.

When the toggle links 90 and 91 are in their collapsed positions, as shown in Fig. 5, the springs 96 hold the embossing dies in their open position. Movement of the dies toward each other is accomplished by straightening the toggle links and thereby moving the lower ends of the die supporting bars away from each other. Between toggle link 90 and die supporting bar 86, there is interposed a spring pressed connecting member 98 through which motion is transmitted to the die supporting bar, the function of the connecting member being to compensate for variations in the wall thickness of the condenser cans.

Mechanism is provided for elevating the embossing dies to telescope the open end of the condenser can, as shown in Fig. 6. This mechanism comprises a cam lever 100 (Fig. 5) having a roller 101 engaging a cam 102 on a cam shaft 103 driven by chain and sprockets 104 (Fig. 4) from shaft 46. At its free end, the cam lever has a roller 106 upon which the plunger 92 together with the entire embossing tool 82 is supported. The cam is designed to elevate the tool to telescope the open end of the can, as shown in Fig. 6, whereupon further upward movement of the tool is prevented by the engagement of a stop pin 108 with the underside of stationary plate 26. Thereafter, further upward movement of the plunger 92 serves to straighten the toggle links and thereby move the embossing dies toward each other to form a section of the embossment or ledge 22. After the embossing dies have been moved to their closed positions, further upward movement of the plunger, if any, is taken up by the spring pressed connecting member 98.

Upon completion of the embossing operation, the cam 102 permits the plunger 94 to move downwardly of its own weight and also under the force of spring 96, whereby the toggle links 90 and 91 are collapsed, thus opening the embossing dies, whereupon the entire embossing mechanism drops to its lowermost position, as shown in Fig. 5. The partially embossed can is then indexed to the next embossing station, where another section of the ledge 22 is formed, and after the final section of the ledge has been formed at embossing station No. 15, the completely formed condenser can is indexed to station No. 16, where the can is automatically ejected from the fixture 33 by means of a vertically reciprocable ejector pin 110 which is adapted to press the condenser can downwardly through the fixture and into a guide chute 111 by which the cans are delivered to a suitable collecting receptacle (not shown). The ejector pin is attached to a vertically reciprocable bar 112 (Fig. 4) which is actuated by a crank arm 114 on cam shaft 103. The crank arm carries a roller 115 for engaging an angle member 116 attached to the lower end of ejector pin actuating bar 112, whereby the bar is depressed by the crank arm, once during each revolution of the cam shaft. A coil spring 118 serves to retract the ejector pin actuating bar to its elevated position, and a cushioning spring 119 is provided for cushioning the return movement of the bar. A collar 121 is fixed to the bar 112 between the two springs so that when the bar moves downwardly, spring 118 is compressed under the collar and is thus rendered effective for subsequently restoring the bar to its elevated position. As the bar approaches its elevated position, the collar 121 strikes the lower end of the upper coil spring 119, which cushions the return movement of the bar.

The operation of the apparatus will be clearly understood from the above description, from which it will be noted that the several mechanisms operate automatically, the only manual effort required being the partial insertion of the condenser cans into the fixtures by an operator positioned at stations 1 and 2. The gauging of the cans to the proper positions in the fixtures, as well as the subsequent trimming, cleaning and embossing operations are all performed automatically as the cans are indexed from station to station until they finally arrive at station No. 16, where they are automatically ejected from the fixtures, as hereinbefore described.

It is to be understood that the invention is not limited to the particular embodiment thereof herein illustrated and described, but is capable of other applications within the scope of the appended claims.

What is claimed is:

1. An article forming apparatus comprising a pair of cooperating forming members mounted for movement toward and away from each other, resilient means for urging said members away from each other, a pair of levers individual to the forming members for supporting them, operating means for said members comprising a toggle mechanism, and a yieldable connection between said toggle mechanism and one of said forming members comprising a link pivotally interconnecting the toggle mechanism to one of the pair of levers, and resilient means tending to hold said one lever and link in a predetermined position relative to each other.

2. In an apparatus for forming an embossed ridge around the perimeter of a polygonal body, a series of means for operating on said body in succession, each comprising cooperating forming members for engaging inner and outer surfaces of said body to simultaneously form a ridge in adjoining sides of the body, a carrier for moving said body from one of said series of means to the other, means for moving said body relative to the carrier to present a different portion to be operated upon by each of the series of means to form a continuous ridge, and means for operating said series of means in automatic succession.

3. In an apparatus for forming a continuous embossed ridge around the perimeter of a polygonal metal container, an intermittently indexed container supporting table, a plurality of embossing tools arranged in pairs adjacent said table to operate on the container, means for moving the table to carry containers thereon into operative association with the pairs of tools, and means for actuating said tools in automatic succession, each pair of said tools being operative upon actuation to form an embossing on adjacent walls of the container extending more than one-half the way from the corner formed by the adjacent walls to the next adjacent walls.

4. In an apparatus for forming a continuous embossed ridge around the perimeter of a polygonal metal container, a plurality of embossing tools arranged in pairs, each pair of tools having cooperating grooves and ridges thereon extending in a direction to conform to the angle between the adjacent sides of the container, means intermittently operable in timed relation to the operation of the tools for moving the container into association with each pair of tools, and means for actuating the tools to form an embossing on two adjacent walls of the container and at the angle between said walls while the container is in association with each pair of tools.

5. In an apparatus for forming an embossed ridge around the perimeter of a polygonal body, a series of means for operating on said body in succession, each comprising cooperating forming members for engaging inner and outer surfaces of said body to simultaneously form a ridge in adjoining sides of the body, a carrier for moving said body from one of said series of means to the other, means for moving said body relative to the carrier to present a different portion to be operated upon by each of the series of means to form a continuous ridge, and means for advancing each of said forming means toward the body on said carrier and operating said forming members to successively form a continuous ridge.

RALPH JONGEDYK.